United States Patent [19]
Gruen

[11] Patent Number: 6,078,600
[45] Date of Patent: Jun. 20, 2000

[54] GENERATION AND USE OF HIGH POWER 213 NM AND 266 NM LASER RADIATION AND TUNABLE 210-400 NM LASER RADIATION WITH BBO CRYSTAL MATRIX ARRAY

[75] Inventor: Dieter M. Gruen, Downers Grove, Ill.

[73] Assignee: The University of Chicago, Chicago, Ill.

[21] Appl. No.: 09/045,468

[22] Filed: Mar. 20, 1998

[51] Int. Cl.[7] ........................................... H01S 3/10
[52] U.S. Cl. ................... 372/21; 372/20; 372/22; 372/109
[58] Field of Search .................... 372/5, 21, 22; 359/569, 326–332; 385/122

[56] References Cited

U.S. PATENT DOCUMENTS

| | | | |
|---|---|---|---|
| 4,639,923 | 1/1987 | Tang | 372/21 |
| 4,686,979 | 8/1987 | Gruen et al. | 128/303.1 |
| 4,784,135 | 11/1988 | Blum et al. | 128/303.1 |
| 5,592,325 | 1/1997 | Dodge | 359/326 |
| 5,631,721 | 5/1997 | Stanton | 355/71 |
| 5,643,252 | 7/1997 | Waner et al. | 128/770 |
| 5,648,866 | 7/1997 | Trebino | 359/326 |
| 5,940,418 | 8/1999 | Shields | 372/22 |
| 5,963,684 | 10/1999 | Ford | 359/11 |

*Primary Examiner*—Frank G. Font
*Assistant Examiner*—Gioacchino Inzirillo
*Attorney, Agent, or Firm*—Emrich & Dithmar

[57] ABSTRACT

A 213 nm laser beam is capable of single photon ablative photodecomposition for the removal of a polymer or biological material substrate. Breaking the molecular bonds and displacing the molecules away from the substrate in a very short time period results in most of the laser photon energy being carried away by the displaced molecules, thus minimizing thermal damage to the substrate. The incident laser beam may be unfocussed and is preferably produced by quintupling the 1064 nm radiation from a Nd:YAG solid state laser, i.e., at 213 nm. In one application, the 213 nm laser beam is expanded in cross section and directed through a plurality of small beta barium borate (BBO) crystals for increasing the energy per photon of the laser radiation directed onto the substrate. The BBO crystals are arranged in a crystal matrix array to provide a large laser beam transmission area capable of accommodating high energy laser radiation without damaging the BBO crystals. The BBO crystal matrix array may also be used with 266 nm laser radiation for carrying out single or multi photon ablative photodecomposition. The BBO crystal matrix array may also be used in an optical parametric oscillator mode to generate high power tunable laser radiation in the range of 210–400 nm.

16 Claims, 1 Drawing Sheet

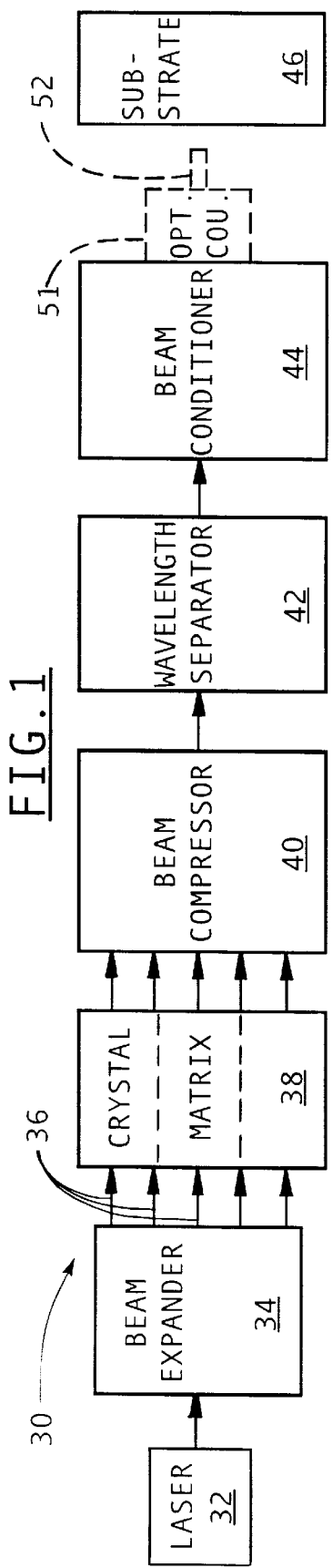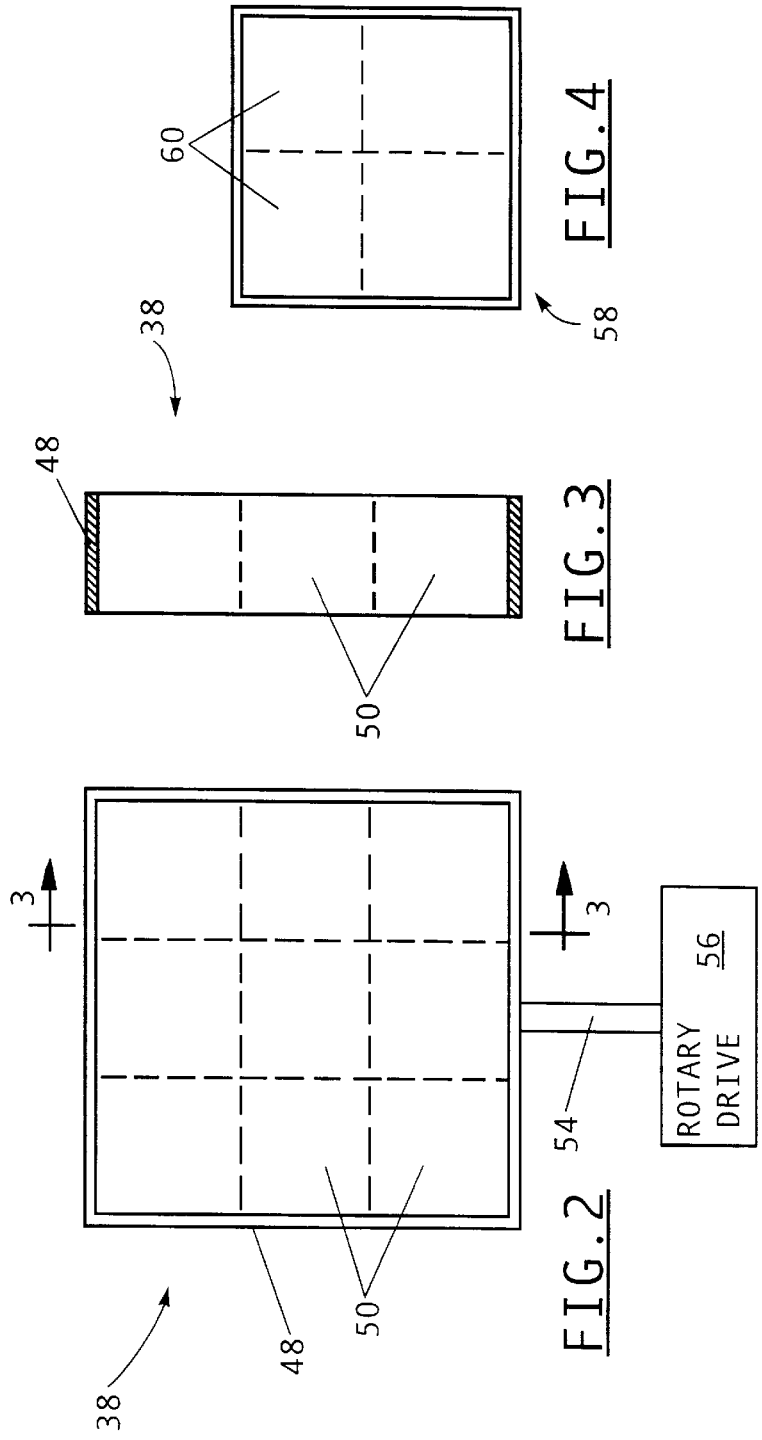

GENERATION AND USE OF HIGH POWER 213 NM AND 266 NM LASER RADIATION AND TUNABLE 210-400 NM LASER RADIATION WITH BBO CRYSTAL MATRIX ARRAY

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to ablative photodecomposition using laser radiation and is particularly directed to the use of laser radiation having a wavelength in the order of 210–400 nm for the single or multi photon ablative photodecomposition of materials such as polymers and biological tissue. This invention relates particularly to the transmission of a tunable laser beam through a crystal matrix array to generate laser radiation with higher than normal power intensity at selectable wavelengths including 213 nm and 266 nm.

BACKGROUND OF THE INVENTION

The phenomenon known as "ablative photodecomposition" was developed in 1982 by Srinivasan et al. using a 193 nm ArF laser and is described in U.S. Pat. No. 4,784,135. At that time, the phenomenon was explained in terms of the excitation of bound molecular states to repulsive and ionic states by single photon absorption of 6.5 ev laser energy. The ablated fragments carry most of the energy away from the substrate surface thus minimizing the conversion of radiant energy into heat. The surface of the ablated substrate, be it a polymer or biological tissue, does not experience charring, carbonization or burning. Both the scientific literature and patents based on this discovery explicitly taught that using laser wavelengths higher than 193 nm to accomplish ablation would obviate the beneficial results of ablation with 193 nm laser radiation and result in burning of the underlying substrate material. Srinivasan explicitly prescribed using an unfocussed 193 nm laser beam.

In 1983, Gruen et al. discovered that a focused 308 nm laser beam produced ablative photodecomposition without charring of tissue and explained this new finding on the basis of multiphoton processes. Although each 4 ev photon of 308 nm radiation does not contain sufficient energy to reach repulsive and ionic molecular states, two-photon absorption can result in ejection of molecular products. However, the simultaneous absorption of two photons can occur only at intensities of 0.1 to 1 GW/cm$^2$, achievable only by focussing the 308 nm beam of an excimer laser. U.S. Pat. No. 4,686,979 based on this discovery points out that tissue can be removed at a location far away from the laser beam source by transmitting the laser light through a fiber optic cable and that the effects on tissue of unfocussed 193 nm laser radiation and focussed 308 nm laser radiation are the same. Thus, it had heretofore been known that an unfocussed 193 nm laser beam could be used in ablative photodecomposition without charring of tissue and it was believed that using a laser beam for this purpose above 193 nm in wavelength required focussing of the beam. It was thought that the 40% decrease in photon energy going from 193 nm to 308 nm laser radiation was compensated for by focussing the 308 nm radiation on the substrate.

The 193 nm excimer laser commonly used in ablative photodecomposition employs fluorine and argon gas to create an ArF molecule in an excited electronic state by virtue of an electrical discharge in the gas. The output of such a laser typically is 100 mJ with a pulse length of 10 nsec and repetition rate of 100 Hz. The beam diameter typically is 1 cm$^2$. The intensity of the laser beam is thus:

$$\frac{100 \times 10^{-3} \text{ J}}{10 \times 10^{-9} \text{ sec} \times 1 \text{ cm}^2} = 10 \text{ Megawatt/cm}^2$$

The fluorine used in the excimer laser is a highly toxic gas. Although there have been advances in the materials used in manufacturing these types of lasers, the gases employed in the laser must be changed periodically requiring pump-down of the laser chamber and occasional major reconditioning of the chamber because of corrosion. In addition to the high toxicity and highly corrosive nature of the gases employed in excimer lasers, this approach also has the undesirable characteristic of producing ozone requiring the enclosing of the laser beam and frequent flushing of the enclosure.

The use of a solid state laser system would avoid the aforementioned problems provided sufficient power was available. Commercially available Nd:YAG lasers present an alternative to the use of the excimer laser in that they afford 50 Hz repetition rates, 1 cm$^2$ beam cross sections, and 1200 mJ output power at the 1064 nm fundamental frequency. Doubling the fundamental frequency and using the sum frequency generated with the 532 nm doubled frequency and 1064 mm fundamental frequency affords 350 mJ of tripled 355 nm radiation. Nonlinear optics crystals known as a beta barium borate (BBO) crystals are frequently used in this type of laser system because of their high UV transmission characteristics. These nonlinear optics crystals decrease the number of photons in the laser beam, and increase the energy per photon in the beam. Using a BBO crystal, one would expect ~50% efficiency from the sum frequency generation using doubled 532 nm and tripled 355 nm radiation to generate on the order 175 mJ of 213 nm radiation. To generate 175 mJ at 213 nm using a 1 cm$^2$ BBO crystal, the largest defect-free size currently available, exceeds the optical damage limit of the crystal material, which is on the order of 35 mJ/cm$^2$ for a 10 nsec laser pulse at 213 nm. The power handling capability of the BBO crystal thus limits the power of the output laser beam.

The present invention addresses the aforementioned limitations of the prior art by providing a BBO crystal matrix array capable of handling high laser beam power without damaging the individual crystals. This invention further contemplates generating an unfocussed 213 nm laser beam using a commercially available, solid state Nd:YAG laser, which beam is particularly adapted for use in single photon ablative photodecomposition such as of polymers and biological tissue. This invention further contemplates generating an unfocussed 266 nm laser beam using a commercially available, solid state Nd:YAG laser, which beam is particularly adapted for transmission through a fiber optic cable and use in single photon ablative photodecomposition. Additionally, this invention contemplates using a crystal matrix array in conjunction with a solid state Nd:YAG laser to generate laser radiation at a selectable wavelength in the range of 210 nm to 400 nm, which is the optimal wavelength to achieve single or multi photon ablation of a given polymer or biological tissue with specific absorptive properties.

OBJECTS AND SUMMARY OF THE INVENTION

Accordingly, it is an object of the present invention to use 213 nm radiation such as from a solid state Nd:YAG laser for single photon ablative photodecomposition.

It is another object of the present invention to use 266 nm radiation such as from a solid state Nd:YAG laser in conjunction with a fiber optic cable for a single photon ablative photodecomposition at a location remote from the laser.

It is a further object of the invention to use a crystal matrix array in conjunction with a solid state Nd:YAG laser to generate laser radiation selected from the range of 210 nm to 400 nm so as to achieve optimal single or multi photon ablative photodecomposition of a specified substrate with given absorptive properties.

It is another object of the present invention to produce a high power laser beam by directing the beam through a matrix array of nonlinear optics crystals which reduce the number of photons in the beam while increasing the energy per photon.

Yet another object of the present invention is to provide a readily available source of laser radiation such as a Nd:YAG laser which is particularly adapted for use in ablative photodecomposition of polymers and biological tissue such as in photolithography, photorefractive keratotomy and other medical applications.

This invention contemplates an arrangement for providing a high power laser beam for single or multi photon ablative photodecomposition, the arrangement comprising a source of a laser beam containing photons; beam expansion means for receiving and increasing a cross sectional area of the laser beam; a plurality of nonlinear optics crystals arranged in a matrix array for receiving the laser beam with increased cross sectional area and for increasing the energy per photon of the laser beam; and beam compression means for receiving and reducing the cross sectional area of the laser beam having increased energy per photon. This invention further contemplates the use of a Nd:YAG laser operated selectively at a wavelength in the range of 210 nm to 400 nm onto a substrate for ablative photodecomposition of the substrate.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIG. 1 is a simplified block diagram of a laser irradiation system employing a beam transmitting crystal matrix array in accordance with the principles of the present invention;

FIG. 2 is a simplified schematic diagram of a crystal matrix array employed in one embodiment of the laser irradiation system of FIG. 1;

FIG. 3 is a sectional view of the crystal matrix array shown in FIG. 2 taken along site line 3—3 therein; and FIG. 4 is a simplified schematic diagram of another embodiment of a crystal matrix array for use in the present invention.

DETAILED DESCRIPTION OF THE PREFERRED EMBODIMENTS

One aspect of the present invention involves the use of unfocussed laser radiation having a wavelength greater than the previously believed wavelength limit of 193 nm for use in single photon as opposed to multi-photon ablative photodecomposition of substrate materials such as polymers and biological tissue. This aspect of the invention contemplates the use of 213 nm laser radiation in single photon ablative photodecomposition of a substrate without charring, carbonization or burning of the substrate. The 213 nm laser beam is not required to be focussed for ablative photodecomposition and is preferably formed by quintupling the 1064 nm radiation of a Nd:YAG laser. The quintupled Nd:YAG laser radiation at 213 nm has a photon energy of 6.1 ev versus 6.5 ev for the ArF laser at 193 nm. This small decrease in photon energy from 6.5 ev for the 193 nm ArF beam to 6.1 ev for the 213 nm Nd:YAG beam, i.e., a decrease on the order of 6%, still affords the single photon absorption process which gives rise to ablative photodecomposition to occur even without focussing the laser beam. Limited focussing and beam shaping can be achieved using a glass member such a high purity silica lens. The small difference, i.e., a 6% reduction, in photon energy between the 193 nm and 213 nm is much smaller than the difference in energy of 40% in comparing the photon energy of 193 nm laser radiation with that of 308 nm laser radiation. For this reason, the laser radiation at 213 nm can utilize an unfocussed beam in single photon ablative photodecomposition, while the laser radiation at 308 nm requires a focussed beam in a multi-photon process. The nonintuitiveness in proceeding from 193 nm to 213 nm laser radiation for use in ablative photon decomposition resides in the recognition that the small 6% difference in photon energy is insufficient to obviate the 1 photon ablative photodecomposition process. The nonintuitiveness of the present invention further resides in the recognition that a sufficiently intense laser beam in an unfocussed state for producing ablative photodecomposition at 213 nm can only be produced by quintupling the 1064 nm output of a Nd:YAG laser to provide a 213 nm beam using the aforementioned crystal matrix array. Nd:YAG lasers are now available in essentially solid state configurations. These low maintenance solid state lasers are very cost effective in carrying out a variety of industrial and surgical procedures such as photolithography and photorefractive keratotomy.

Referring to FIG. 1, there is shown in simplified block diagram form a laser irradiation system 30 employing a beam transmitting crystal matrix array 38 in accordance with the principles of the present invention. FIG. 2 is a simplified schematic diagram of a crystal matrix array 38 employed in the laser irradiation system 30 of FIG. 1. FIG. 3 is a sectional view of the crystal matrix array 38 shown in FIG. 2 taken along site line 3—3 therein.

The laser irradiation system 30 includes a laser 32 which is preferably a Nd:YAG laser having a fundamental wavelength of 1064 nm which is operated at the second (532 nm) and third (355 nm) harmonic wavelengths or the first (1064 nm) and fourth (266 nm) harmonic wavelengths. These beams of laser 32 are directed to a telescopic beam expander 34 which increases the beam cross section as shown by the increased number of light rays 36 emitted by the beam expander. The laser beam with increased cross sectional area is then directed to a crystal matrix 38 comprised of a plurality of nonlinear optics crystals 50 as shown in FIG. 2. Each of the nonlinear optics crystals is preferably comprised of beta barium borate (BBO) which increases the energy per photon of the beam. The output of the crystal matrix 38 in the form of a laser beam with increased energy per photon is provided to a telescopic beam compressor 40 which reduces the cross section of the beam without a loss in energy. The laser beam with reduced cross sectional area is then provided to a wavelength separator, or optical filter, 42 which then provides the filtered beam to a beam conditioner 44. Beam conditioner 44 provides an output laser beam having a desired cross section sectional shape and dimension, and directs this beam onto the substrate 46 from which material is to be removed or modified by single photon ablative photodecomposition without charring, carbonization or burning. In another embodiment, a Nd:YAG laser is used to provide 266 nm radiation which is directed onto substrate 46 from beam conditioner 44 via the combination of an optical coupler 51 and a fiber optic cable 52 shown in FIG. 1 in dotted line form.

As shown in FIG. 2, a plurality of BBO crystals 50 each having a generally square cross section are arranged edge-to-edge in a generally square matrix array. The BBO crystal matrix 38 is a 3×3 matrix array of crystals 50. Each of the BBO crystals 50 is preferably 12 mm ×12 mm in cross section, with each crystal polished and ground to a smooth finish and placed in tight fitting, abutting contact with other similar BBO crystals. The crystal matrix array 38 is held together by means of a metal frame, or holder, 48 disposed about and engaging the peripheral crystals. The metal frame 48 is coupled to a rotary drive 56 by means of a support shaft 54. Rotary drive 56 provides rotational displacement for the BBO crystal matrix 38 relative to the incident laser beam to obtain the proper phase matching direction of the beam through the crystals for maximum conversion efficiency. In the BBQ crystal matrix 38 of FIGS. 2 and 3, an increase in intensity of a laser beam of an order of magnitude can be obtained because an input beam intensity of at least 350 mJ/cm$^2$ of 355 nm radiation can be accommodated without causing optical damage to the BBO crystals 50.

Referring to FIG. 4, there is shown a simplified schematic diagram of another embodiment of a BBO crystal matrix 58 for use in the present invention. BBO crystal matrix 58 includes a 2×2 array of crystals 60. The BBO crystal matrix 58 of FIG. 4 is capable of producing 10 nsec pulses having a power greater than 100 mJ (4×35 mJ/cm$^2$) at a pulse repetition rate of 50 Hz using commercially available Nd:YAG lasers operated at the second and third harmonic outputs of these lasers. This concept is extended by the 9×9 crystal matrix array 38 of FIG. 2 to produce at least 200 mJ laser pulses at 213 nm with a more powerful commercially available Nd:YAG. This power output using a solid state laser is comparable to the power output of the 193 nm excimer laser used in the prior art.

There has thus been shown an arrangement for providing a 213 nm laser beam capable of single photon ablative decomposition for the removal of a polymer or biological material substrate. The laser beam may be unfocussed and is preferably produced by quintupling the 1064 nm radiation from a Nd:YAG solid state laser. In one application, the 213 nm laser beam is expanded in cross section and directed through a plurality of small BBO crystals arranged in a matrix array for increasing the energy per photon of the laser radiation. The BBO crystal matrix array may be comprised of various numbers of individual crystals depending upon the power of the laser beam. The matrix array may also be used with a Nd:YAG laser operated at the fourth harmonic of 266 nm, with sufficient intensity to enable transmission through a commercially available fiber optic cable.

In an alternate embodiment, the crystal matrix array of the present invention is used in conjunction with a commercially available optical parametric oscillator (OPO), known in the prior art. Commercially available OPO's with solid-state design use a single nonlinear optical crystal to convert the output from a conventional laser into two new frequencies, effectively producing widely tunable, multicolor coherent sources. In this embodiment of the present invention, the crystal matrix array is substituted for a single crystal, thereby enabling tunability at higher power intensities. Used in conjunction with a Nd:YAG, the modified OPO can generate laser radiation having wavelengths in the range of 210 nm to 400 nm at power levels on the order of magnitude higher than possible with currently available apparatus.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. An arrangement for providing a high power laser beam for single or multi photon ablative photodecomposition, said arrangement comprising:

a source of a laser beam containing photons;

beam expansion means for receiving and increasing a cross sectional area of said laser beam;

a plurality of single nonlinear optics crystals arranged in a matrix array for receiving said laser beam with increased cross sectional area and for increasing the energy per photon of the laser beam, wherein said single nonlinear optics crystals are optically aligned to provide phase matching for the laser beam transmittal through each of said single nonlinear optics crystals; and beam compression means for receiving and reducing the cross sectional area of said laser beam having increased energy per photon.

2. The arrangement of claim 1 wherein said nonlinear optics crystals are beta barium borate (BBO) crystals.

3. The arrangement of claim 2 wherein each of said BBO crystals is on the order of 12 mm in width and height.

4. The arrangement of claim 1 further comprising a frame disposed about the BBO crystals and engaging the outermost crystals for maintaining the crystals in said matrix array.

5. The arrangement of claim 4 wherein said frame is metal.

6. The arrangement of claim 4 further comprising rotary drive means coupled to said frame for rotating said matrix array of nonlinear optics crystals for changing a crystal phase matching direction and obtaining maximum conversion efficiency.

7. The arrangement of claim 1 further comprising, in combination, a wavelength separator and a beam conditioner for directing said laser beam having increased energy per photon onto a substrate.

8. The arrangement of claim 7 further comprising glass transmission means coupled to said beam conditioner for transmitting said laser beam having increased energy onto a substrate located remotely from the said laser means.

9. The arrangement of claim 1 wherein said source of said laser beam is a Nd:YAG laser and said laser beam has a wavelength in the range of 210 nm to 400 nm when operated in an optical parametric oscillator mode.

10. A method for providing a high power laser beam for single or multi photon ablative photodecomposition, said method comprising the steps of:

providing a laser beam containing photons;

expanding said laser beam for producing a laser beam having an increased cross sectional area;

directing said laser beam having said increased cross sectional area through a matrix array of single nonlinear optics crystals for increasing the energy per photon of the laser beam, wherein said single nonlinear optics crystals are optically aligned to provide phase matching for the laser beam transmitted through each of said single nonlinear optics crystals; and compressing the laser beam for reducing the cross sectional area of the laser beam with increased energy per photon.

11. The method of claim 10 further comprising the step of rotating said matrix array of nonlinear optics crystals for changing a crystal phase matching direction and obtaining maximum conversion efficiency.

12. The method of claim 10 further comprising the step of operating said matrix array of nonlinear optics crystals in an optical parametric oscillator mode for providing high power tunable laser radiation in the range of 210–400 nm.

13. The method of claim 10 wherein the step of providing a laser beam includes operating a Nd:YAG laser beam source at a fifth harmonic of its fundamental wavelength of 1064 nm for providing said laser beam with a wavelength of approximately 213 nm.

14. The method of claim 10 wherein the step of providing a laser beam includes operating a Nd:YAG laser in a fourth harmonic of its fundamental wavelength of 1064 nm for providing said laser beam with a wavelength of approximately 266 nm.

15. The method of claim 11 further comprising the step of directing said laser beam having increased energy per photon through a combination of a wavelength separator and a beam conditioner.

16. The method of claim 15 further comprising the step of transmitting said laser beam having increased energy per photon through a fiber optic cable for directing the laser beam onto a substrate located remotely from a source of the laser beam.

* * * * *

UNITED STATES PATENT AND TRADEMARK OFFICE
CERTIFICATE OF CORRECTION

PATENT NO. : 6,078,600

DATED : June 20, 2000

INVENTOR(S) : Dieter M. Gruen

It is certified that error appears in the above-identified patent and that said Letters Patent is hereby corrected as shown below:

COLUMN    LINE

6          40          "1" should be --2--

Signed and Sealed this

Twenty-fourth Day of April, 2001

Attest:

NICHOLAS P. GODICI

Attesting Officer    *Acting Director of the United States Patent and Trademark Office*